(12) United States Patent
Bittner

(10) Patent No.: US 12,207,646 B2
(45) Date of Patent: Jan. 28, 2025

(54) SYSTEMS AND METHODS FOR ALTERING AN ACTUATOR OF AN AGRICULTURAL APPLICATOR

(71) Applicant: CNH Industrial America LLC, New Holland, PA (US)

(72) Inventor: Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 706 days.

(21) Appl. No.: 17/217,376

(22) Filed: Mar. 30, 2021

(65) Prior Publication Data
US 2021/0368771 A1 Dec. 2, 2021

Related U.S. Application Data

(60) Provisional application No. 63/032,068, filed on May 29, 2020.

(51) Int. Cl.
*A01M 7/00* (2006.01)
(52) U.S. Cl.
CPC ........ *A01M 7/0089* (2013.01); *A01M 7/0042* (2013.01)
(58) Field of Classification Search
CPC .. A01M 7/005; A01M 7/0057; A01M 7/0089; A01M 7/0042
See application file for complete search history.

(56) References Cited

U.S. PATENT DOCUMENTS

| 4,186,878 A | 2/1980 | Lestradet |
| 6,202,013 B1 | 3/2001 | Anderson et al. |
| (Continued) | | |

FOREIGN PATENT DOCUMENTS

| CN | 104330279 A | 2/2015 |
| CN | 108152071 A | 2/2015 |
| (Continued) | | |

OTHER PUBLICATIONS

Thomas-Murphy, Jenn, "Mobile Applications", Field Crops, Cornell CALS, dated 2021, (4 Pages) https://fieldcrops.cals.cornell.edu/tools-resources/mobile-apps/.

(Continued)

*Primary Examiner* — Tuongminh N Pham
(74) *Attorney, Agent, or Firm* — Rebecca Henkel; Peter K. Zacharias; Rickard K. DeMille

(57) ABSTRACT

An agricultural sprayer system is provided herein that can include a boom assembly having a frame and a boom arm operably coupled with the frame. The boom arm can be rotatable relative to the frame between a plurality of angles in a fore-aft direction. An actuator operably can be coupled with the frame and the boom arm and configured to rotate the boom arm between the plurality of angles. A sensor can be operably coupled with the boom assembly and configured to capture data associated with a position of the boom assembly. A computing system can be communicatively coupled to the sensor and configured to calculate a boom assembly deflection magnitude and a fore-aft deflection direction based on the data from the sensor and activate the actuator to rotate the boom arm relative to the frame when the magnitude of deflection deviates from a predefined threshold.

14 Claims, 6 Drawing Sheets

(56) References Cited

U.S. PATENT DOCUMENTS

| | | |
|---|---|---|
| 6,454,294 B1 | 9/2002 | Bittner et al. |
| 7,752,779 B2 | 7/2010 | Schoenmaker et al. |
| 9,382,003 B2 | 7/2016 | Burema et al. |
| 9,994,307 B2 | 6/2018 | Nguyen et al. |
| 10,095,235 B2 | 10/2018 | Sugumaran et al. |
| 10,244,747 B2 | 4/2019 | Leeb et al. |
| 10,252,285 B2 | 4/2019 | Barker et al. |
| 10,485,191 B2 * | 11/2019 | Malsam ............... A01G 25/16 |
| 2005/0000277 A1 * | 1/2005 | Giles ................ A01M 7/0089 73/114.51 |
| 2006/0225489 A1 * | 10/2006 | Giles ................ G01N 29/032 73/64.53 |
| 2013/0068892 A1 | 3/2013 | Bin Desa et al. |
| 2014/0074360 A1 * | 3/2014 | Rosa ..................... G05D 3/12 701/50 |
| 2016/0255769 A1 | 9/2016 | Leeb |
| 2016/0330948 A1 * | 11/2016 | Schnaider .......... A01M 7/0085 |
| 2017/0131718 A1 | 5/2017 | Matsumura et al. |
| 2017/0305537 A1 | 10/2017 | Smith et al. |
| 2018/0156770 A1 | 6/2018 | Saez et al. |
| 2018/0281798 A1 * | 10/2018 | Kremmer ............ A01M 7/0089 |
| 2018/0364157 A1 | 12/2018 | Ghiraldi et al. |
| 2021/0127567 A1 * | 5/2021 | Loukili ............... A01M 7/0042 |

FOREIGN PATENT DOCUMENTS

| | | |
|---|---|---|
| CN | 204236769 | 4/2015 |
| CN | 107235146 A | 10/2017 |
| CN | 107907365 A | 4/2018 |
| CN | 107963214 A | 4/2018 |
| EP | 3235380 | 10/2017 |
| EP | 3372078 | 9/2018 |
| GB | 2457388 | 8/2009 |
| GB | 2521343 | 5/2018 |

OTHER PUBLICATIONS

"SenseFly", Agriculture, Parrot Group, Apr. 5, 2019, (11 pages) https://www.sensefly.com/industry/agriculture/.

* cited by examiner

SYSTEMS AND METHODS FOR ALTERING AN ACTUATOR OF AN AGRICULTURAL APPLICATOR

CROSS-REFERENCE TO RELATED APPLICATIONS

This application is a non-provisional application claiming the benefit of priority under 35 U.S.C. § 119(e) to U.S. Provisional Application No. 63/032,068, filed May 29, 2020, which is hereby incorporated by reference in its entirety.

FIELD

The present disclosure relates generally to agricultural applicators, such as agricultural sprayers and, more particularly, to systems and methods for monitoring a boom assembly during an application operation and altering various components.

BACKGROUND

Various types of work vehicles utilize applicators (e.g., sprayers, floaters, etc.) to deliver an agricultural product to a ground surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s).

The applicators may be pulled as an implement or self-propelled, and can include a tank, a pump, a boom assembly, and one or more nozzle assemblies carried by the boom assembly at spaced apart locations. The boom assembly can include a pair of boom arms, with each boom arm extending to either side of the applicator when in an unfolded state. Each boom arm may include multiple boom segments, with each boom segment capable of being associated with a number of nozzle assemblies. Each nozzle assembly typically includes a spray nozzle and an associated nozzle valve to regulate the output of the spray nozzle. With such configurations, a product pump is configured to supply an agricultural product through a pump line to individual boom arm lines coupled in parallel to the pump line, with each boom arm line being coupled in parallel to the respective spray nozzles of such boom segment to allow the agricultural product to be supplied to each individual spray nozzle.

During an application operation, however, various factors may affect a quality of application of the agricultural product to the field. For instance, boom movement of the boom assembly while the vehicle moves along the field may lead to inconsistent application of the agricultural product. Accordingly, an improved system and method for monitoring the quality of application of the agricultural product to the field by monitoring movement of the boom assembly would be welcomed in the technology.

BRIEF DESCRIPTION

Aspects and advantages of the invention will be set forth in part in the following description, or may be obvious from the description, or may be learned through practice of the invention.

In some aspects, the present subject matter is directed to an agricultural sprayer system that can include a boom assembly having a frame and a boom arm operably coupled with the frame. The boom arm can be rotatable relative to the frame between a plurality of angles in a fore-aft direction. An actuator operably can be coupled with the frame and the boom arm and configured to rotate the boom arm between the plurality of angles. A sensor can be operably coupled with the boom assembly and configured to capture data associated with a position of the boom assembly. A computing system can be communicatively coupled to the sensor and configured to calculate a boom assembly deflection magnitude and a fore-aft deflection direction based on the data from the sensor and activate the actuator to rotate the boom arm relative to the frame when the magnitude of deflection deviates from a predefined threshold.

In some aspects, the present subject matter is directed to an agricultural sprayer system that can include an actuator operably coupled with a frame and a boom arm. The actuator can be configured to rotate the boom arm between a plurality of angles in a fore-aft direction. The plurality of angles can include a default angle defining a default axis relative to the frame. A sensor can be operably coupled with the boom arm and configured to capture data associated with a position of the boom arm. A computing system can be communicatively coupled to the sensor. The computing system can be configured to calculate a fore-aft deflection direction when the boom arm is in a deflected position based on the data from the sensor and to rotate the boom arm through the actuator in a direction opposite the deflection direction.

In some aspects, the present subject matter is directed to a method for monitoring an application operation that can include dispensing an agricultural product from one or more nozzle assemblies along a boom arm. The method can further include receiving data indicative of a deflection magnitude of the boom arm extending from a frame. The method can also include determining a deflection magnitude of the boom arm. Lastly, the method can include rotating the boom arm from a first angle relative to the frame to a second angle when the deflection magnitude deviates from a predefined threshold.

These and other features, aspects, and advantages of the present technology will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
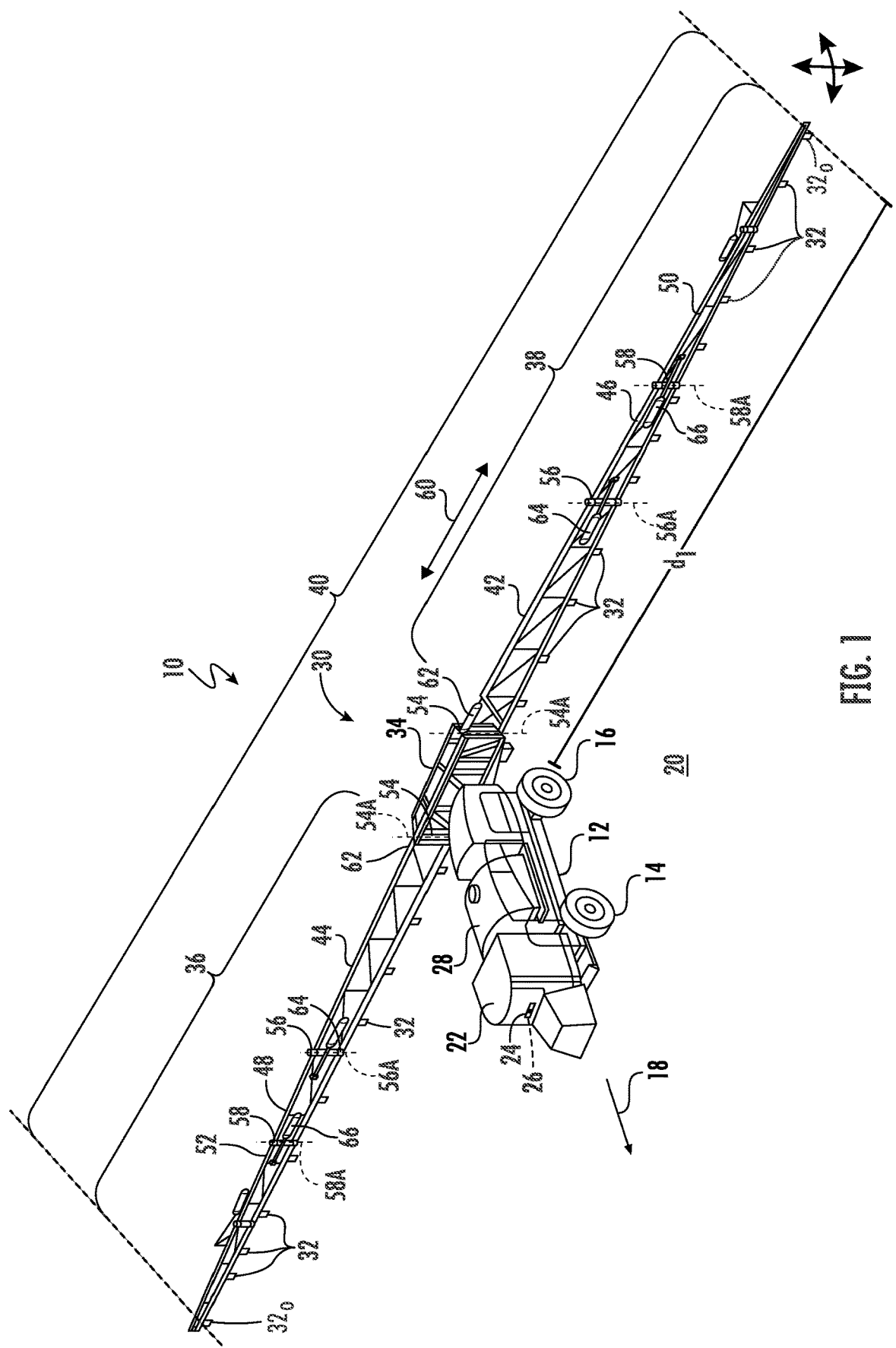
FIG. 1 illustrates a perspective view of some embodiments of an agricultural applicator in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for monitoring a boom assembly of a sprayer during an application operation and controlling various operations of the boom assembly, such as by making a one-time adjustment to one or more operating parameters associated with the operation of the boom assembly based on the data generated by monitoring the boom assembly.

In several embodiments, the boom assembly may be configured to couple with a work vehicle, such as a sprayer. The boom assembly can include a frame and one or more boom arms that include one or more nozzle assemblies spaced apart along the one or more boom arms. In several embodiments, the boom arms are rotatable relative to the frame between a plurality of angles in a fore-aft direction by an actuator coupled with the frame and one of the one or more boom arms. For instance, the plurality of angles can include a storage angle when one or both of the boom arms are positioned in a folded, inoperable position. One or both of the boom arms can also be rotated to a default angle relative to the frame in which one or both of the boom arms extend a default direction from the frame for operative use of the boom arm.

During an application operation, various forces may cause the boom arms may move in a vertical direction, a fore-aft direction (i.e., a direction of travel), and/or a combination thereof. For instance, a portion of the boom assembly may be deflected (moved from an assumed or default position) due to dynamic forces encountered when the sprayer is turned, accelerated or decelerated. In addition, field variations and weather variances may also cause deflection of the boom assembly. Further, a portion of the boom assembly may come in contact with an object thereby leading to deflection of the boom assembly. Moreover, recent innovations in the industry can lead to even greater amounts of deflection of the boom assembly, such as ever larger spray booms and faster ground speeds by the sprayer during the application operation. Another contributor to deviation can be the introduction of boom yaw control, wherein a boom hinge position is purposefully controlled to reduce boom stress, which further moves the nozzles from their assumed positions.

When the boom arms move in the fore-aft direction, portions of the boom arm and the nozzle assemblies positioned along the boom arm are offset from their positions when compared to a default boom position in which the boom arm is free of deflection. The offset in position of the individual nozzle assemblies along the boom arm due to deflection, relative to their assumed position can become a significant factor in application accuracy as many application routines use the assumed or default position of the nozzle assemblies to determine an application rate. The deflection of the boom arm may also create a variance between the default field swath and an actual spray area. In such instances, various portions of the field may have a misapplication of the agricultural product applied thereto, which may be in the form of an overapplication or an underapplication of the agricultural product.

To monitor the movement of the boom assembly, one or more sensors are operably coupled with the boom assembly. The one or more sensors may be configured to provide data related to a position of a portion of the boom assembly. A computing system is communicatively coupled to the one or more sensors. Upon receiving data from the one or more sensors, the computing system can calculate a deflection magnitude (or displacement) and/or a fore-aft deflection direction of the boom arm. If the calculated deflection magnitude deviates from a predefined threshold, the computing system may activate the actuator to rotate the boom arm relative to the frame to reposition the boom arm to counteract the deflection at an adjusted angle. By counteracting the deflection, the actuator can reduce or minimize an offset distance between the nozzle assembly with the boom arm in the deflected position from the nozzle assembly with the boom arm in the default position. By minimizing the offset, a more precise application may be completed by the sprayer thereby reducing misapplication of the agricultural product across a field.

Figure 2:
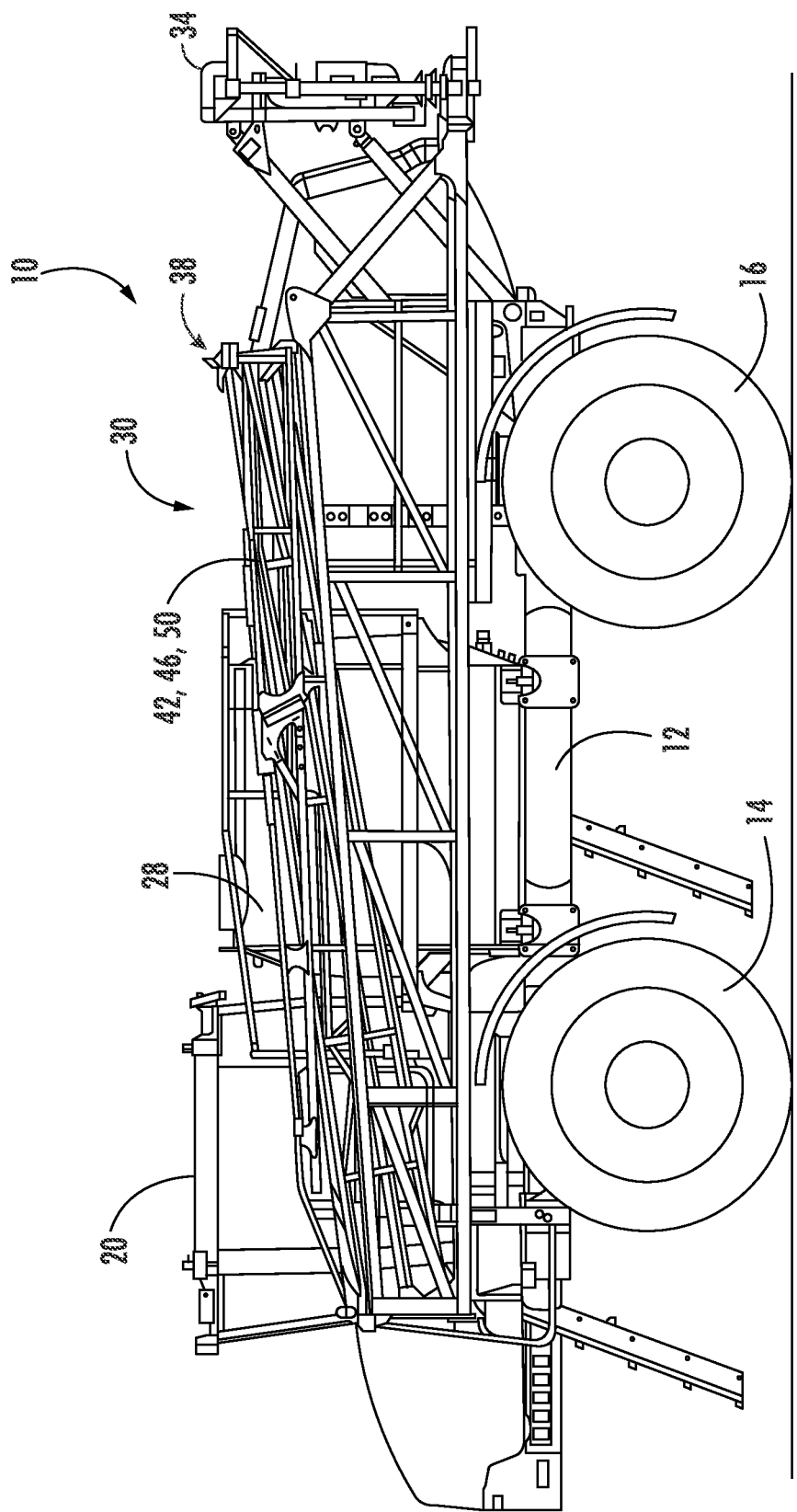
FIG. 2 illustrates a side view of the applicator shown in FIG. 1 in accordance with aspects of the present subject matter, particularly illustrating the applicator in a transport position.

Referring now to FIGS. 1 and 2, an agricultural applicator is generally illustrated as a self-propelled agricultural sprayer 10. However, in alternative embodiments, the agricultural applicator may be configured as any other suitable type of the agricultural applicator configured to perform an agricultural spraying or other product application operations, such as a tractor or other work vehicle configured to haul or tow an applicator implement.

In some embodiments, such as the one illustrated in FIG. 1, the agricultural sprayer 10 may include a chassis 12 configured to support or couple to a plurality components. For example, front and rear wheels 14, 16 may be coupled to the chassis 12. The wheels 14, 16 may be configured to support the agricultural sprayer 10 relative to a ground surface and move the agricultural sprayer 10 in a direction of travel (e.g., as indicated by arrow 18 in FIG. 1) across a field 20. In this regard, the agricultural sprayer 10 may include a power plant, such as an engine, a motor, or a hybrid engine-motor combination, and a transmission configured to transmit power from the engine to the wheels 14, 16.

The chassis 12 may also support a cab 22, or any other form of operator's station, that houses various control or input devices (e.g., levers, pedals, control panels, buttons, and/or the like) for permitting an operator to control the operation of the sprayer 10. For instance, as shown in FIG. 1, the agricultural sprayer 10 may include a user interface or human-machine interface (HMI) 24 for providing messages and/or alerts to the operator and/or for allowing the operator to interface with the vehicle's controller through one or more user-input devices 26 (e.g., levers, pedals, control panels, buttons, and/or the like) within the cab 22 and/or in any other practicable location.

The chassis 12 may also support one or more tanks, such as a product tank 28 and/or a rinse tank, and a boom assembly 30. The product tank 28 is generally configured to store or hold an agricultural product, such as a pesticide(s) (e.g., an herbicide(s), insecticide(s), rodenticide(s), etc.) and/or a nutrient(s). The agricultural product is conveyed from the product tank 28 through a product circuit including numerous plumbing components, such as interconnected pieces of tubing, for release onto the underlying field 20 (e.g., plants and/or soil) through one or more nozzle assemblies 32 mounted on the boom assembly 30 (or the sprayer 10). Each nozzle assembly 32 may include, for example, a spray nozzle and an associated nozzle valve for regulating the flow rate of the agricultural product through the nozzle (and, thus, the application rate of the nozzle assembly 32), thereby allowing the desired spray characteristics of the output or spray fan of the agricultural product expelled from the nozzle to be achieved.

As shown in FIGS. 1 and 2, the boom assembly 30 can include a frame 34 that supports first and second boom arms 36, 38, which may be orientated in a cantilevered nature. The first and second boom arms 36, 38 are generally movable between an operative or unfolded position (FIG. 1) and an inoperative or folded position (FIG. 2). When distributing the agricultural product, the first and/or second boom arm 36, 38 extends laterally outward from the agricultural sprayer 10 to the operative position in order to cover wide swaths of the underlying ground surface, as illustrated in FIG. 1. When extended, each boom arm 36, 38 defines a first lateral distance $d_1$ defined between the frame 34 and an outermost nozzle assembly and/or an outer end portion of the boom arms 36, 38. Further, the boom arms 36, 38, when both unfolded, define a field swath 40 between the respective outermost nozzle assemblies $32_o$ of the first and second boom arms 36, 38 that is generally commensurate with an area of the field 20 to which the agricultural sprayer 10 covers during a pass across a field 20 to perform the agricultural operation. However, it will be appreciated that in some embodiments, a single boom arm 36, 38 may be utilized during the application operation. In such instances, the field swath 40 may be an area defined between a pair of nozzle assemblies 32 that are furthest from one another in the lateral direction 60.

To facilitate transport, each boom arm 36, 38 of the boom assembly 30 may be independently folded forwardly or rearwardly into the inoperative position, thereby reducing the overall width of the sprayer 10, or in some examples, the overall width of a towable implement when the applicator is configured to be towed behind the agricultural sprayer 10.

Each boom arm 36, 38 of the boom assembly 30 may generally include one or more boom sections. For instance, in the illustrated embodiment, the first boom arm 36 includes three boom sections, namely a first inner boom section 42, a first middle boom section 46, and a first outer boom section 50, and the second boom arm 38 includes three boom sections, namely a second inner boom section 44, a second middle boom section 48, and a second outer boom section 52. In such an embodiment, the first and second inner boom sections 42, 44 may be pivotably coupled to the frame 34. Similarly, the first and second middle boom sections 46, 48 may be pivotably coupled to the respective first and second inner boom sections 42, 44, while the first and second outer boom sections 50, 52 may be pivotably coupled to the respective first and second middle boom sections 46, 48. For example, each of the inner boom sections 42, 44 may be pivotably coupled to the frame 34 at pivot joints 54. Similarly, the middle boom sections 36, 38 may be pivotally coupled to the respective inner boom sections 32, 34 at pivot joints 56, while the outer boom sections 40, 42 may be pivotably coupled to the respective middle boom sections 36, 38 at pivot joints 58.

As is generally understood, pivot joints 54, 56, 58 may be configured to allow relative pivotal motion between the adjacent boom sections of each boom arm 36, 38. For example, the pivot joints 54, 56, 58 may allow for articulation of the various boom sections between a fully extended or working position (e.g., as shown in FIG. 1), in which the boom sections are unfolded along a lateral direction 60 of the boom assembly 30 to allow for the performance of an agricultural spraying operation, and a transport position (FIG. 2), in which the boom sections are folded inwardly to reduce the overall width of the boom assembly 30 along the lateral direction 60. It should be appreciated that, although each boom arm 36, 38 is shown in FIG. 1 as including three individual boom sections coupled along opposed sides of the central boom section, each boom arm 36, 38 may generally have any suitable number of boom sections.

Additionally, as shown in FIG. 1, the boom assembly 30 may include inner fold actuators 62 coupled between the inner boom sections 42, 44 and the frame 34 to enable pivoting or folding between a plurality of angles in a fore-aft direction by an actuator coupled with the frame 34 and one of the one or more boom arms 36, 38. For instance, the plurality of angles can include a storage angle when one or both of the boom arms 36, 38 are positioned in a folded, inoperable position. One or both of the boom arms 36, 38 can also be rotated to a default angle relative to the frame 34 in which one or both of the boom arms 36, 38 extend a default direction from the frame 34 for operative use of the boom arms 36, 38.

For example, by retracting/extending the inner fold actuators 62, the inner boom sections 42, 44 may be pivoted or folded relative to the frame 34 about a pivot axis 54A defined by the pivot joints 54. Moreover, the boom assembly 30 may also include middle fold actuators 64 coupled between each inner boom section 42, 44 and its adjacent middle boom section 46, 48 and outer fold actuators 66 coupled between each middle boom section 46, 48 and its adjacent outer boom section 50, 52. As such, by retracting/extending the middle and outer fold actuators 64, 66, each middle and outer boom section 46, 48, 50, 52 may be pivoted or folded relative to its respective inwardly adjacent boom section 42, 44, 46, 48 about a respective pivot axis 56A, 58A. When moving to the transport position, the boom assembly 30 and fold actuators 62, 64, 66 are typically oriented such that the pivot axes 54A, 56A, 58A are generally parallel to the vertical direction and, thus, the various boom sections 42, 44, 46, 48, 50, 52 of the boom assembly 30 are configured to be folded horizontally (e.g., parallel to the lateral direction 60) about the pivot axes 54A, 56A, 58A to keep the folding height of the boom assembly 30 as low as possible for transport. However, the pivot axes 54A, 56A, 58A may be oriented along any other suitable direction.

Figure 3:
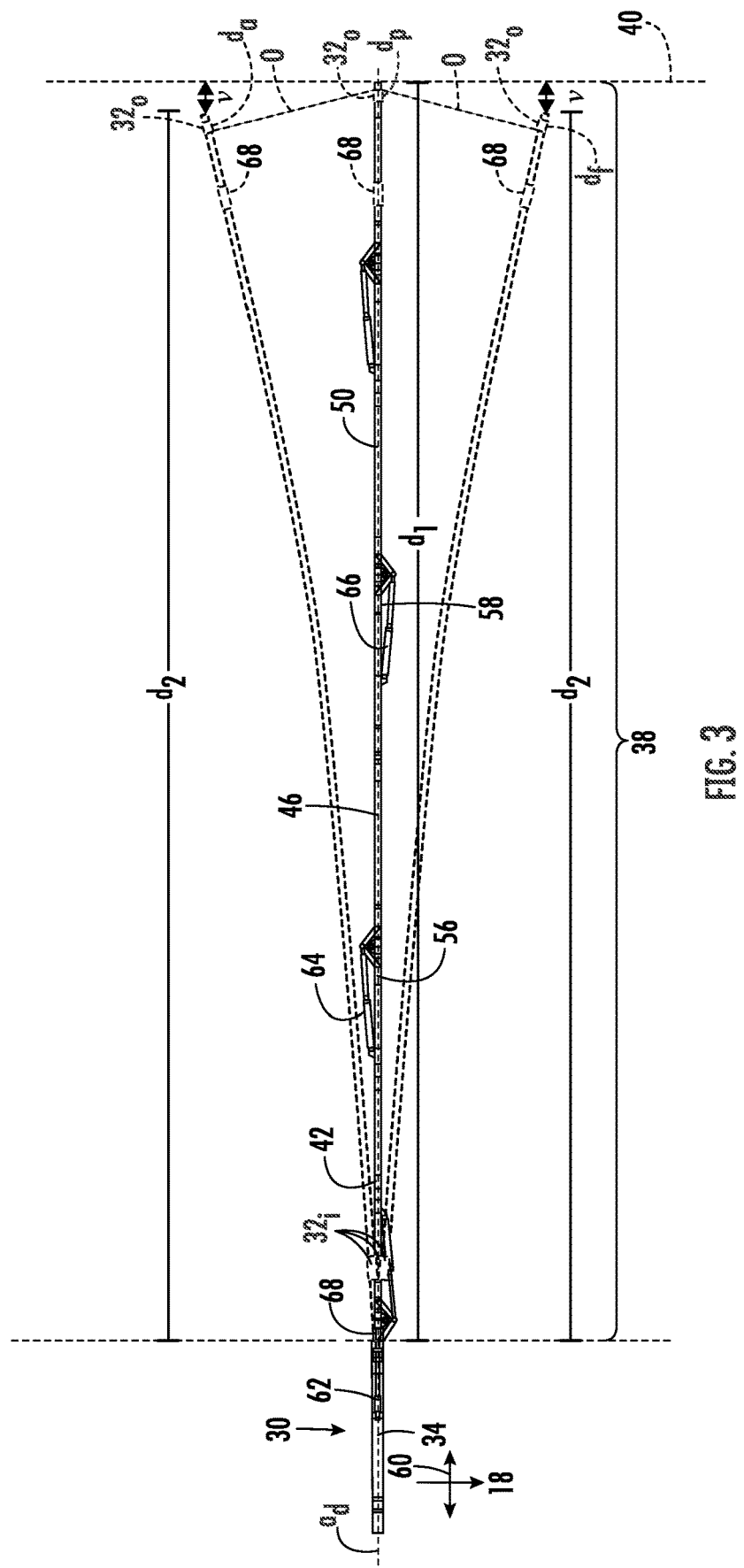
FIG. 3 illustrates a simplified, schematic view of one embodiment of a boom arm of a boom assembly in accordance with aspects of the present subject matter, particularly illustrating the boom arm being deflected in a forward and a rearward direction.

Referring to FIG. 3, prior to performing an agricultural operation with the boom assembly 30, each boom arm 36, 38 may be configured to extend a first lateral distance $d_1$ away from the sprayer 10 and/or the frame 34 along a default axis $a_d$. It will be appreciated that although boom arm 36 is generally illustrated in FIG. 3, any boom arm 36, 38 of the boom assembly 30 may operate in a similar manner without departing from the scope of the present disclosure.

In various embodiments, the default axis $a_d$ may generally be offset ninety degrees relative to the vehicle travel direction such that the default axis $a_d$ is generally aligned with the lateral direction 60. The first lateral distance $d_1$ can be defined as a distance between the frame 34 and an outer nozzle assembly $32_o$ and/or an outer end portion of each boom arm 36, 38. Moreover, when the first and second boom arms 36, 38 are extended from opposing sides of the frame 34, the boom arms 36, 38 can define a field swath 40 (one side of the field swath is illustrated in FIG. 3) between the outer nozzle assemblies $32_o$ of the first and second boom arms 36, 38, or between the outer end portions of the first and second boom arms 36, 38 depending on the agricultural operation and/or specific spray operation. Further, in some operations, a single boom arm 36, 38 may be used. In such instances, the field swath 40 may be defined between an outer and an inner operating nozzle assembly $32i$, $32_o$.

During operation, various forces may be placed on the boom assembly 30 causing the boom arms 36, 38 and, consequently, the nozzle assemblies 32 positioned along the boom arms 36, 38, to be deflected or repositioned relative to the frame 34 and/or sprayer 10. For instance, a portion of the boom assembly 30 may be deflected from an assumed or a default position $d_p$ due to high dynamic forces encountered when the sprayer 10 is turned, accelerated, or decelerated. In addition, terrain variations and weather variances may also cause deflection of the boom assembly 30. Further, a portion of the boom assembly 30 may come in contact with an object, thereby leading to deflection of the boom assembly 30.

Once the boom arm 36 is deflected in a fore direction $d_f$ (i.e., a direction of forward movement of the sprayer 10 as indicated by arrow 18 in FIG. 1) and/or in an aft direction $d_a$ (i.e., an opposing direction of the forward movement of the sprayer 10 as indicated by arrow 18 in FIG. 1) of its default position $d_p$, as generally illustrated in FIG. 3, the outer nozzle assembly $32_o$ may be positioned a second lateral distance $d_2$ from the frame 34, which may be less than the first lateral distance $d_1$ due to a curvature of the boom assembly 30. Accordingly, a lateral variance v is formed between the first and second lateral distances $d_1$, $d_2$. This lateral variance v may lead to a misapplication of an agricultural substance to the underlying field 20, which may be in the form of an overapplication or an underapplication of the agricultural product. For instance, in the area of the underlying field 20 between the frame 34 and the outer nozzle assembly $32_o$ may have an overapplication of the agricultural product applied thereto when the boom arm 36 is deflected, while the portion of the underlying field 20 below the variance v may have an underapplication of the agricultural product applied thereto. In addition to creating a variance v, the deflection of the boom arm 36 also creates an offset between the outer nozzle assembly $32_o$ in the default position $d_p$ and the deflected positions $d_f$, $d_a$, which may also lead to inaccuracies during application of the agricultural product to the underlying field 20.

In embodiments, such as the one illustrated in FIG. 3, that utilize a boom arm 36 that is supported by the frame 34 in a cantilevered orientation (or any other non-uniform orientation), an outer nozzle assembly $32_o$ will have a greater deflection magnitude from its default position $d_p$ than an inner nozzle assembly $32_i$. Once the deflective force is overcome and/or no longer present, the boom arm 36 will move back towards its default position $d_p$. In some embodiments, the movement of the boom arm 36 may generally occur as harmonic oscillations across the default axis $a_d$ such that the boom arm 36 may move from a position at least partially aft of the default axis $a_d$ to the default position $d_p$ and then to a position at least partially fore of the default position $d_p$ and so on. During the oscillations, an acceleration of an inner nozzle assembly $32_i$ will be less than the outer nozzle assembly $32_o$ due to the varied deflection magnitudes along the boom arm 36.

In some embodiments, a boom speed or boom acceleration of each nozzle assembly 32 along the boom arm 36 may be calculated based on the detected and/or calculated position of various portions of the boom arm 36 at known time periods. The boom speed or boom acceleration may be a speed or acceleration of the boom arm 36 proximate to defined positions of each nozzle assembly 32 relative to the frame 34. In some examples, the frame 34 may be affixed to the sprayer 10 and/or the frame 34 of the sprayer 10 such that the frame 34 moves at a common chassis speed as the sprayer 10. Based on the summation of the boom speed, or boom acceleration, with the chassis speed, a nozzle speed/acceleration relative to the field 20 may be calculated. In various embodiments, when a product pump 72 is operated at a known flow rate and the nozzle speed is calculated, an application rate (e.g., gallons per acre (GPA)) of agricultural product may be calculated for each nozzle assembly 32 along the boom arm 36. In some instances, a desired application rate of agricultural product may be defined. When applying agricultural product to an underlying field 20, if the calculated application rate (e.g., GPA) of agricultural product deviates from the desired application rate of agricultural product by more than a predefined percentage, a notification may be provided and/or areas of a field 20 in which the deviation occurs may be illustrated on one or more displays, as will be described in greater detail below.

With further reference to FIG. 3, a sensor 68 can be configured to output data indicative of a measured boom position, a measured boom height, a measured pitch angle, a measured yaw angle, a measured pressure, a measured velocity, a measured acceleration/deceleration, and/or a measured roll angle of the sprayer 10 and/or the boom assembly 30. The boom position information detected by the sensor 68 may enable the sprayer 10 to calculate a curvature of the boom assembly and determine boom arm movement of the one or more boom arms 36, 38 of the boom assembly 30 based on the curvature. The boom arm movement may be any metric of measurement that determines that at least a portion of the boom arm 36 has deviated from the default position $d_p$, which may be detected by determining that the boom arm 36 has moved from the default axis $a_d$ by a deflection magnitude at any point along the boom arm 36 or that a portion of the boom arm 36 is experiencing an acceleration/deceleration that is varied from that of the frame 34 and/or the sprayer 10.

In some examples, a first sensor 68 may be positioned on one of the boom arms 36, 38 at a position proximate to the frame 34 and a second sensor 68 may be positioned on proximate the outer portion of the boom assembly 30. Based on the relationship of the first sensor 68 to the second sensor 68, an estimated curvature of the boom assembly 30 may be calculated. In other examples, a single sensor 68, which may be mounted on the boom arms 36, 38, may be used to calculate an estimated curvature of the boom assembly 30. In still yet other examples, the sensor 68 may be positioned on the frame 34 and/or the sprayer 10 and monitor the boom assembly 30 remotely such that the boom assembly 30 is free of sensors 68 and the estimated curvature of the boom assembly 30 is calculated by the remote sensor 68.

Figure 4:
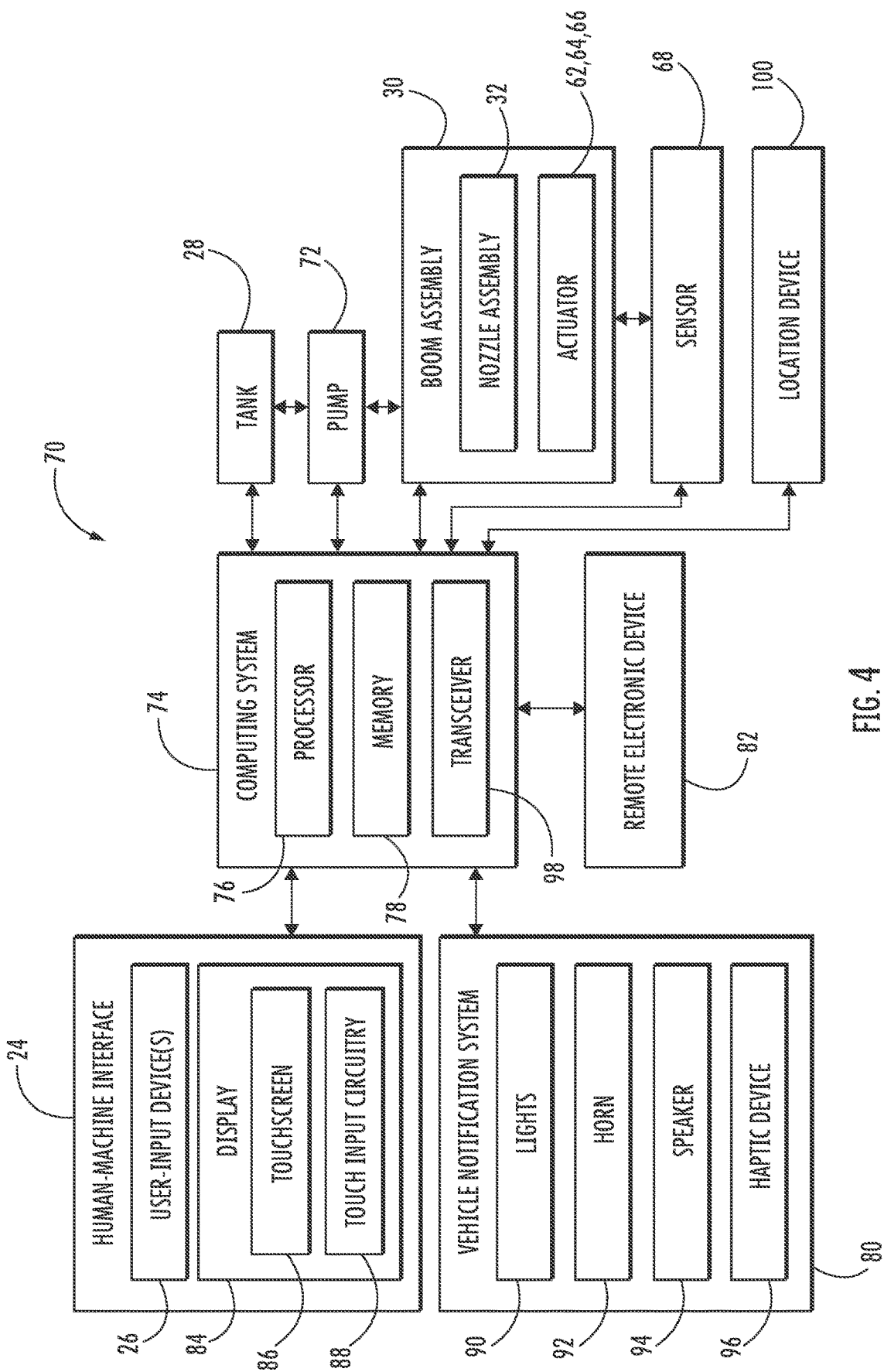
FIG. 4 illustrates a block diagram of components of a system for monitoring the boom assembly during an application operation in accordance with aspects of the present subject matter.

Referring to FIG. 4, a system 70 is illustrated in accordance with various aspects of the present subject matter. In general, the sprayer system 70 will be described herein in relation to the agricultural sprayer 10 described above with reference to FIGS. 1-3. However, it should be appreciated that the sprayer system 70 may be advantageously utilized to control the application of the agricultural product in association with any other suitable agricultural applicator, including sprayers having any other suitable sprayer configuration.

In several embodiments, the sprayer system 70 may include various boom-related components of an associated agricultural applicator, such as one or more of the components of the boom assembly 30 described above. For instance, as shown in FIG. 1, the sprayer system 70 can include the boom assembly 30, which includes the frame 34 and one or more boom arms 36, 38 extending from the frame 34. The boom assembly 30 is further configured to support one or more nozzle assemblies 32 spaced there along. In general, each nozzle assembly 32 is configured to dispense an agricultural product stored within an associated tank (e.g., product tank 28) onto the underlying field 20 and/or plants by a pump 72. In this regard, each nozzle assembly 32 may include a nozzle valve and an associated spray tip or spray nozzle. In several embodiments, the operation of each nozzle valve may be individually controlled such that the valve regulates the flow rate of the agricultural product through the associated nozzle assembly 32, and thus, the application rate of the agricultural product dispensed from the respective spray nozzle. Such control of the operation of the nozzle valve may also be used to achieve the desired spray characteristics for the output or spray fan expelled from the associated spray nozzle, such as a desired droplet size and/or spray pattern. For instance, the nozzle valve may be configured to be pulsed between open/closed positions relative to an orifice of the adjacent spray nozzle at a given frequency and duty cycle (e.g., using a pulse width modulation (PWM) technique) to achieve the desired flow rate and spray characteristics for the respective nozzle assembly 32 so that a Referring to FIG. 4, a sprayer system 70 is illustrated in accordance with various aspects of the present subject matter. In general, the sprayer system 70 will be described herein in relation to the agricultural sprayer 10 described above with reference to FIGS. 1-3. However, it should be appreciated that the sprayer system 70 may be advantageously utilized to control the application of agricultural product in association with any other suitable agricultural applicator, including sprayers having any other suitable sprayer configuration.

In several embodiments, the sprayer system 70 may include various boom-related components of an associated agricultural applicator, such as one or more of the components of the boom assembly 30 described above. For instance, as shown in FIG. 1, the sprayer system 70 can include the boom assembly 30, which includes the frame 34 and one or more boom arms 36, 38 extending from the frame 34. The boom assembly 30 is further configured to support one or more nozzle assemblies 32 spaced there along. In general, each nozzle assembly 32 is configured to dispense an agricultural product stored within an associated tank (e.g., product tank 28) onto the underlying field 20 and/or plants by a pump 72. In this regard, each nozzle assembly 32 may include a nozzle valve and an associated spray tip or spray nozzle. In several embodiments, the operation of each nozzle valve may be individually controlled such that the valve regulates the flow rate of the agricultural product through the associated nozzle assembly 32, and thus, the application rate of the agricultural product dispensed from the respective spray nozzle. Such control of the operation of the nozzle valve may also be used to achieve the desired spray characteristics for the output or spray fan expelled from the associated spray nozzle, such as a desired droplet size and/or spray pattern. For instance, the nozzle valve may be configured to be pulsed between open/closed positions relative to an orifice of the adjacent spray nozzle at a given frequency and duty cycle (e.g., using a pulse width modulation (PWM) technique) to achieve the desired flow rate and spray characteristics for the respective nozzle assembly 32.

Referring still to FIG. 4, the sprayer system 70 may also include a computing system 74 communicatively coupled to one or more components of the agricultural sprayer 10 to allow the operation of such components to be electronically or automatically controlled by the computing system 74. For instance, the computing system 74 may be communicatively coupled to the position sensor 68 and/or systems of the sprayer 10 and/or the boom assembly 30. During an application operation, the one or more sensors 68 are configured to output a signal indicative of a measured boom position, a measured boom height, a measured pitch angle, a measured yaw angle, a measured pressure, and/or a measured roll angle of the sprayer 10 and/or the boom assembly 30. Various sensors including pressure, acoustic, infrared, capacitance, optical, and the like may be utilized to determine the position of the boom assembly 30. For example, in some embodiments, the position sensor 68 may be configured as a pressure sensor that is operably coupled with an actuator 62, 64, 66 of the boom assembly 30 and/or positioned between two portions of the boom assembly 30 that are hingedly coupled to one another at one of the joints (e.g., 54, 56, 58) of the boom assembly 30. In instances in which the pressure sensor is operably coupled with an actuator 62, 64, 66 of the boom assembly 30, the pressure sensor may monitor pressure changes during the agricultural operation. Based on the variations in pressure within the actuator 62, 64, 66, the computing system 74 can calculate a curvature of the boom arm 36, 38. Based on the estimated curvature of the boom arm 36, 38, the computing system 74 may calculate a deflection magnitude and/or a deflection direction of the boom arm 36, 38.

In some embodiments, the sensor 68 may be configured as a strain gauge that detects strain indicative of the deflection of at least one of the boom arms 36, 38 at a joint 54, 56, 58 of the boom assembly 30. In various embodiments, the position sensor 68 may be capacitive displacement sensors, Hall effect sensors, string potentiometers, or the like. Based on the detected strain, a curvature of the boom arm 36, 38 may be calculated. Based on the estimated curvature of the boom arm 36, 38, the computing system 74 may calculate a deflection magnitude and/or a deflection direction of the boom arm 36, 38.

Additionally, and/or alternatively, in some examples, the sensor 68 may be configured as an inertial measurement unit (IMU) that measures a specific force, angular rate, and/or an orientation of at least one of the boom arms 36, 38 using a combination of accelerometers, gyroscopes, magnetometers, and/or any other practicable device. The accelerometer may correspond to one or more multi-axis accelerometers (e.g., one or more two-axis or three-axis accelerometers) such that the accelerometer may be configured to monitor the acceleration of the sprayer 10 and/or the boom assembly 30 in multiple directions, such as by sensing the sprayer 10 acceleration along three different axes. It will be appreciated, however, that the accelerometer may generally correspond to any suitable type of accelerometer without departing from the teachings provided herein.

With further reference to FIG. 4, in accordance with aspects of the present subject matter, the one or more sensors 68 may additionally or alternatively correspond to an image sensor. In various embodiments, the image sensors may correspond to a stereographic camera having two or more lenses with a separate image sensor for each lens to allow the camera to capture stereographic or three-dimensional images. However, in alternative embodiments, the image sensors may correspond to any other suitable sensing devices configured to capture image or image-like data, such as a monocular camera, a LIDAR sensors, and/or a RADAR sensors.

In embodiments incorporating an image sensor, each image sensor may be coupled to or mounted on the boom assembly 30 and configured to detect image data relating to a location of an object separated from the boom arm 36, 38 at two instances with a defined time period between the two instances. As such, the computing system 74 can calculate an acceleration, orientation, and movement direction of the boom arm 36, 38 based on the image data. Based on the calculated movement and/or position of the boom arm 36, 38, the computing system 74 may further determine a curvature of the boom arm 36, 38 based on the two instances, and consequently, a deflection magnitude and/or a deflection direction of the boom arm 36, 38.

Additionally, and/or alternatively, in some embodiments, one or more image sensors may be separated from the boom arm 36, 38 with at least a portion of the boom arm 36, 38 within a field of view of the image sensor. For example, the image sensor may be positioned on the frame 34 of the boom assembly 30 and/or on the sprayer 10. In such instances, the image sensor may be capable of detecting the position of the boom arm 36, 38. In some examples, the image sensor may detect a position of the boom arm 36, 38 at two separate instances with a defined time period between the two instances. Accordingly, the image sensor may be capable of detecting a position and a movement of the boom assembly 30. Based on this information, the computing system 74 may calculate an estimated boom arm curvature and a deflection magnitude and/or a deflection direction of the boom arm 36, 38.

In some embodiments, the sensors 68 may additionally or alternatively correspond to one or more fluid conduit pressure sensors. In general, the pressure sensors may be configured to capture data indicative of the pressure of the agricultural product being supplied to the nozzle assemblies 32. As such, the pressure sensors may be provided in fluid communication with one of the fluid conduits that fluidly couple the product tank 28 to the nozzle assemblies 32. For example, the pressure sensor may correspond to a diaphragm pressure sensor, a piston pressure sensor, a strain gauge-based pressure sensor, an electromagnetic pressure sensor, and/or the like. In operation, as one or both of the boom arms 36, 38 deflect, pressure variances may be caused along the fluid conduit. Accordingly, by measuring the pressure variances through the sensor 68, the computing system 74 may be capable of determining an estimated boom arm curvature and, consequently, a deflection magnitude and/or a deflection direction of the boom arm 36, 38.

In various embodiments, the sensors 68 may additionally or alternatively correspond to one or more airspeed sensors. In general, the airspeed sensors may be configured to capture data indicative of the airspeed of the air flowing past the boom assembly 30. The airspeed data may, in turn, be indicative of the speed at which the air moves relative to the boom assembly 30. In this respect, airspeed data may consider both the airflow caused by the movement of the boom arm 36, 38 relative to the ground and the airflow caused by any wind that is present. For example, the airspeed sensors may correspond to a pitot tube, an anemometer, and/or the like. By measuring the movement of the boom arm 36, 38 relative to the ground through the sensor 68, the computing system 74 may be capable of determining an estimated boom arm curvature and, consequently, a deflection magnitude and/or a deflection direction of the boom arm 36, 38.

In general, the computing system 74 may comprise one or more processor-based devices, such as a given controller or computing device or any suitable combination of controllers or computing devices. Thus, in several embodiments, the computing system 74 may include one or more processor(s) 76, and associated memory device(s) 78 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 78 of the computing system 74 may generally comprise memory element(s) including, but not limited to, a computer-readable medium (e.g., random access memory RAM)), a computer-readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 148 may generally be configured to store suitable computer-readable instructions that, when implemented by the processor(s) 76, configure the computing system 74 to perform various computer-implemented functions, such as one or more aspects of the methods and algorithms that will be described herein. In addition, the computing system 74 may also include various other suitable components, such as a communications circuit or module, one or more input/output channels, a data/control bus and/or the like.

It should be appreciated that the various functions of the computing system 74 may be performed by a single processor-based device or may be distributed across any number of processor-based devices, in which instance such devices may be considered to form part of the computing system 74. For instance, the functions of the computing system 74 may be distributed across multiple application-specific controllers, such as a pump controller, individual nozzle controllers, and/or the like.

The computing system 74 may provide instructions for various other components communicatively coupled with the computing system 74 based on the results of the data analysis. For example, the computing system 74 may provide notification instructions to the HMI 24, a vehicle notification system 80, and/or a remote electronic device 82 if the deflection magnitude exceeds a predefined threshold, a nozzle speed increases above a defined threshold, the calculated application rate deviates from a predefined threshold due to the boom deflection, and/or if the calculated variance v deviates from a predefined range as such an occurrence may cause an inadequate application to a portion of the field 20.

In some examples, the HMI 24 may include a display 84 having a touchscreen 86 mounted within a cockpit module, an instrument cluster, and/or any other location of the sprayer 10. The display 84 may be capable of displaying information related to the boom assembly 30 or any other information. In some embodiments, the HMI 24 may include a user-input device 26 in the form of circuitry 88 within the touchscreen 86 to receive an input corresponding with a location over the display 84. Other forms of input, including one or more joysticks, digital input pads, or the like can be used in place or in addition to the touchscreen 86. In some instances, a predefined threshold for deflection magnitude, a predefined application rate (and deviation threshold), a maximum nozzle speed, and/or a predefined threshold for the calculated variance v may be set, either as an initial/default value or range or as an operator defined value or range through the touchscreen 86 and/or any other user-input device 26. The predefined range may be agricultural product specific.

In some embodiments, the vehicle notification system 80 may prompt visual, auditory, and tactile notifications and/or warnings when a deflection magnitude deviates from predefined threshold, a predefined application rate deviates from a predefined threshold, a maximum nozzle speed is exceeded, and/or a calculated variance v deviates from a predefined threshold. For instance, vehicle lights 90 and/or vehicle emergency flashers may provide a visual alert. A vehicle horn 92 and/or a speaker 94 may provide an audible alert. A haptic device 96 integrated into a steering wheel, a seat, an armrest, and/or any other location may provide a tactile alert.

The sprayer system 70 may communicate via wired and/or wireless communication with the remote electronic devices 82 through a transceiver 98. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 82 may also include a display for displaying information to a user. For instance, the electronic device 82 may display one or more graphical user interfaces and may be capable of receiving remote user-inputs to set a predefined range for boom movement, a predefined threshold for the variance v, and/or to input any other information, such as the agricultural product to be used in an application operation. In addition, the electronic device 82 may provide feedback information, such as visual, audible, and tactile alerts. It will be appreciated that the electronic device 82 may be any one of a variety of computing devices and may include a processor and memory. For example, the electronic device 82 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

In several embodiments, a location device 100 may be configured to determine the location of the agricultural sprayer 10 and/or the boom assembly 30 by using a satellite navigation location device 100 (e.g. a GPS system, a Galileo location device, the Global Navigation satellite system (GLONASS), the BeiDou Satellite Navigation and Location device, a dead reckoning device, and/or the like). In such embodiments, the location determined by the location device 100 may be transmitted to the computing system 74 (e.g., in the form location coordinates) and stored within the computing system 74 for subsequent processing and/or analysis. Based on the location data, the computing system 74 may additionally store the location of the sprayer 10 at the time of the notification. The stored location may be displayed through a field map to illustrate locations of the field 20 in which an agricultural product may have been misapplied. In addition, the field map may further illustrate a detected position, a corrected position, and/or a projected position of the boom assembly with no active mitigation thereof.

In some embodiments, the sprayer system 70 may also provide the operator with various mitigation techniques for returning the deflection magnitude within the predefined threshold, the predefined application rate within the predefined threshold, a nozzle speed to less than the maximum nozzle speed, and/or the calculated variance v within the predefined threshold. For example, when inclement weather is detected, the computing system 74 may provide instructions for altering a function of the sprayer 10 that assists in an offset of the boom arm 36, 38 from its default position $d_p$, such as by providing damping measures or slowing the sprayer 10. It will be appreciated that the notifications provided by the computing system 74 may include any other information relating to any other component of the sprayer 10 and/or the boom assembly 30. In addition, the notifications may include instructions for mitigating any issue that may occur in relation to any component of the sprayer 10. Additionally, and/or alternatively, the computing system 74 may actively control various operations of the sprayer 10, such as by making a one-time adjustment to one or more operating parameters associated with the operation of the sprayer 10 and/or the boom assembly 30 based on the data generated by the sensor 68.

Figure 5:
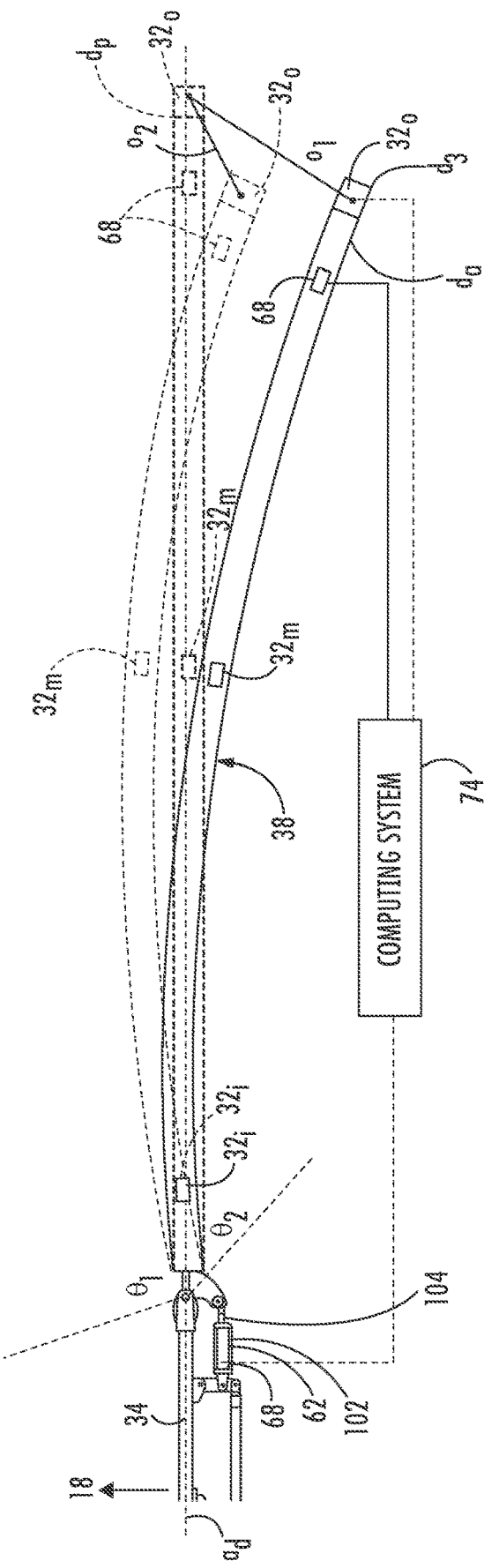
FIG. 5 a simplified, schematic view of some embodiments of a product application system in accordance with aspects of the present subject matter, particularly illustrating the system including an actuator that compensates for deflection of the boom assembly.

Referring now to FIG. 5, in various embodiments, based on data received from the one or more sensors 68, the computing system 74 can determine whether the deflection magnitude of one of the boom arms 36, 38 deviates from a predefined threshold. The deflection magnitude may be a measure of an estimated variance, an estimated offset between a calculated nozzle assembly position and an assumed or default nozzle assembly position, a detected pressure at one or more fold actuators 62, 64, 66 of the boom arm 36, 38, an estimated curvature of the boom arm 36, 38, and/or any other metric that may be calculated or estimated based on the deflection magnitude.

In some embodiments, when the deflection magnitude of one of the boom arms 36, 38 deviates from the predefined threshold, the computing system 74 may activate the actuator 62 to reposition the boom arm 36, 38 to minimize the offset between the nozzle assemblies 32 (such as the outer nozzle assembly $32_o$) between the default position and the calculated position of the outermost nozzle based on the calculated deflection magnitude. While FIG. 5 illustrates a single actuator 62 operably coupling the boom arm 38 to the frame 34, it will be appreciated that the boom arm 38 may include any number of sections that are rotatable relative to one another along the boom arm 36 by one or more actuators 62, 64, 66 (FIG. 1) as illustrated in FIG. 1.

In some instances, the computing system 74 is further configured to determine a deflection direction, which may be quantified in a fore/aft direction. Based on the deflection direction, an actuator 62 can rotate the boom arm 36, 38 such that an inner portion $38_i$ of the boom arm 36, 38 is rotated to an opposing side of the default axis $a_d$ from the detected deflection direction to counteract the positional offsets caused by the deflection. For instance, as illustrated in FIG. 5, the boom arm 36, 38 may be deflected in aft direction $d_a$ causing the outermost nozzle assembly $32_o$ to be displaced from its default position by an offset distance $o_1$. In response, the actuator 62 may rotate the boom arm 38 from the default axis $a_d$ to an adjusted angle such that the inner portion $38_i$ of the boom arm 38 is positioned at least partially fore of the default axis $a_d$ and, thus, on an opposing side of the default from the detected deflection direction. As used herein, the deflection direction is determined by the position of the outer portion of the boom arm 38 relative to the default axis $a_d$. For instance, when the outer portion of the boom arm 38 is deflected aft of the default axis $a_d$, the deflection direction is considered to be in the aft direction. Likewise, when the outer portion of the boom arm 38 is deflected fore of the default axis $a_d$, the deflection direction is considered to be in the fore direction.

Once the boom arm 38 is repositioned to the adjusted angle, the outermost nozzle assembly $32_o$ on the deflected boom arm 38 is offset from the outermost nozzle assembly $32_o$ in the default position by a second offset distance $o_2$, which is less than the first offset distance $o_1$ thereby reducing the deviation between assumed or default position of the outermost nozzle assembly $32_o$. By reducing the deviation between the projected position of the outermost nozzle assembly $32_o$ and the actual position of the nozzle assembly $32_o$, more accurate agricultural product application can be achieved and/or an application rate along the boom arm 36, 38 may be more consistent than prior to movement of the boom arm 36, 38.

With further reference to FIG. 5, in some embodiments, the computing system 74 may be configured to select the adjusted angle from a look up table of adjusted angle values stored in the memory 78 to manipulate the actuator 62 when the magnitude of deflection deviates from a predefined threshold. As the boom arm 38 may be deflected both fore and aft of the default position, the look up table may provide adjusted angles $\theta_1$, $\theta_2$ that place an inner portion of the boom assembly 30 both fore and aft of the default position. Accordingly, the actuator 62 is configured to rotate the boom arm 38 fore and aft of the default axis $a_d$. For example, the actuator 62 may be configured to rotate an angle $\theta_1$ at least 100 degrees fore of the default angle and an angle $\theta_2$ at least 15 degrees aft of the default angle. In some examples, first and second stops may be positioned on the frame 34 and/or boom arm 38 and configured to limit rotation between the two stops such that the rotational range of the boom arm 38 is equal to the summation of the absolute value of $\theta_1$ and the absolute value of $\theta_2$.

In various embodiments, an extendable actuator 62, such as a hydraulic actuator, can include a cylinder or sleeve 102 and a rod 104. The sleeve 102 can have a first and a second hydraulic port for linearly moving the rod 104 via an internal piston with respect to sleeve 102 when pressurized fluid is applied to one of the ports. Due to the movement of the boom arm 38 in both the fore and aft directions, in some embodiments, the rod 104 may be kept in an intermediate position with regards to its stroke when the boom arm 38 is in the default position.

With further reference to FIG. 5, by reducing an offset between the calculated position of the outermost nozzle assembly $32_o$ when the boom arm 38 is deflected relative to the assumed or default position of the outermost nozzle assembly $32_o$, other nozzles assemblies $32_i$, $32_m$ along the boom arm 38 may also have an offset reduced or minimized. As illustrated in FIG. 5, the rotational point of the boom arm 38, or anchor location, of the boom arm 38 is at an inner end thereof. Accordingly, deflection of the boom arm 38 causes minor offsets between for an innermost nozzle assembly $32_i$ and adjusting the boom arm 38 to the adjusted angle may also cause minimal changes to the offset between the calculated position of the innermost nozzle assembly $32_i$ and the assumed or projected position of the innermost nozzle assembly $32_i$. An intermediate nozzle assembly $32_m$ may have an offset that is generally similar between the default position and the adjusted position. In some examples, the lookup table may be configured to minimize both the offset of the outermost nozzle assembly $32_o$ and the intermediate nozzle assembly $32_m$. In various embodiments, when a summation of the offsets of each nozzle assembly $32_o$, $32_i$, $32_m$ between the adjusted and unadjusted positions are calculated with the boom arm 38 in a deflected position, the total offset may be minimized by the adjustment.

Figure 6:
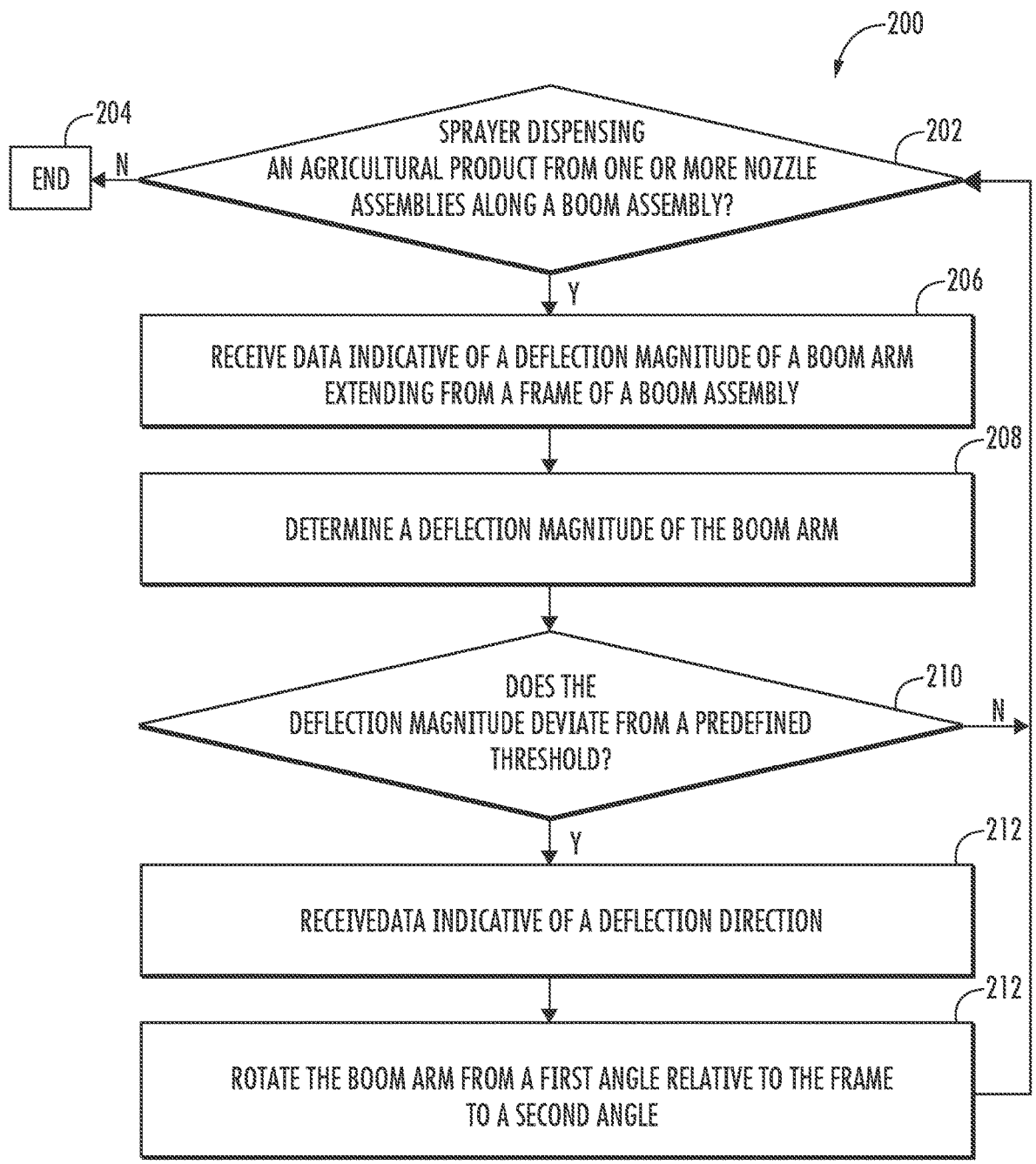
FIG. 6 illustrates a flow diagram of one embodiment of a method for operating an agricultural applicator in accordance with aspects of the present subject matter.

Referring now to FIG. 6, a flow diagram of some embodiments of a method 200 for monitoring a spray quality during an application operation is illustrated in accordance with aspects of the present subject matter. In general, the method 200 will be described herein with reference to the sprayer 10, the boom assembly 30, and the sprayer system 70 described above with reference to FIGS. 1-5. However, it should be appreciated by those of ordinary skill in the art that the disclosed method 200 may generally be utilized to monitor one or more application variables of any suitable applicator associated with any suitable agricultural sprayer 10 and/or may be utilized in connection with a system having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, the method provided herein may implement (closed loop and/or open loop) strategies. For example, at step (202), the method 200 may begin by determining if a sprayer 10 is dispensing an agricultural product from one or more nozzle assemblies 32 along a boom assembly 30. If the sprayer 10 is not dispensing an agricultural product, the method ends at step (204).

If the sprayer 10 is dispensing an agricultural product, the nozzle assemblies 32 may dispense or otherwise spray a fan of the agricultural product onto the underlying field 20. While dispensing the agricultural product, at step (204), the method 200 may include receiving data indicative of a deflection magnitude of a boom arm 38 extending from a frame 34 of a boom assembly 30 from one or more sensors 68. For instance, in some embodiments, the one or more sensors 68 can include a pressure sensor and the data can be indicative of a position of a boom arm 38 extending from a frame 34 of a boom assembly 30.

Based on the received data, the computing system 74 may determine the curvature of the boom arm 38. Based on the calculated curvature, a deflection magnitude may be calculated at step (208).

As provided herein, a predefined threshold can be stored in the computing system 74. At step (210), the calculated deflection magnitude is compared to the predefined threshold. If the calculated deflection magnitude is less than the predefined threshold, the method 200 may return to step (202). If the calculated deflection magnitude is greater than the predefined threshold, the method 200 may proceed to step (212), wherein the computing system 74 receives data indicative of a deflection direction.

At step (214), the method can include activating an actuator 62, 64, 66 to rotate the boom arm 38 between first and second angles. The second angle may position at least a portion of the boom arm 38 on an opposing side of a default axis from the deflection direction to counteract the deflection of the boom arm 38. As provided herein, the actuator 62, 64, 66 can be configured to rotate at least 15 degrees in both a fore and an aft direction from the first angle while dispensing the agricultural product. In some examples, the nozzle assembly 32 is positioned in a default position when the boom assembly 30 is free of deflection and extends at the first angle. By rotating the boom arm 38 between the first and second angles, the computing system 74 can minimize an offset between a nozzle assembly 32 with the boom in the deflected position from the nozzle assembly 32 in the default position thereby leading to increased precision in the application of the agricultural product to the underlying field 20. After rotating an actuator 62, 64, 66 to the second angle, the method can return to step (202).

It is to be understood that the steps of the method 200 are performed by the controller upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the controller described herein, such as the method 200, is implemented in software code or instructions which are tangibly stored on a tangible computer-readable medium. The controller loads the software code or instructions via a direct interface with the computer-readable medium or via a wired and/or wireless network. Upon loading and executing such software code or instructions by the controller, the controller may perform any of the functionality of the controller described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

A variety of advantages may be derived from the use of the present disclosure. For example, use of the system and method provided herein can lead to advantages that include, but are not limited to cost, strength, durability, life cycle cost, marketability, appearance, packaging, size, serviceability, weight, manufacturability, ease of assembly, etc. In addition, by minimizing the offset of an actual nozzle assembly position from the default, or assumed, position, the system provided herein may provide better coverage of a field by an agricultural product. Such systems may be even more beneficial when the nozzle assemblies are configured to intermittently apply agricultural product to distinct portions or plants within the underlying field.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural sprayer system comprising:
   a boom assembly having a frame and a boom arm operably coupled with the frame, the boom arm rotatable relative to the frame between a plurality of angles in a fore-aft direction, the plurality of angles including a default angle defining a default axis relative to the frame;
   an actuator operably coupled with the frame and the boom arm, the actuator configured to rotate the boom arm between the plurality of angles;
   a sensor operably coupled with the boom assembly and configured to capture data associated with a position of the boom assembly;
   a nozzle assembly supported by an outer end portion of the boom arm; and
   a computing system communicatively coupled to the sensor, the computing system being configured to:
   calculate a curvature of the boom assembly based on the data from the sensor;
   calculate a fore-aft deflection direction when the boom arm is in a deflected position based on the curvature of the boom assembly;
   calculate an offset distance between a first position of an outmost nozzle assembly in the default position and a second position of the nozzle assembly in the deflected position; and
   rotate the boom arm through the actuator to an adjusted angle, wherein the boom arm is rotated in a direction opposite the deflection direction and the adjusted angle that reduces the offset distance.

2. The system of claim 1, wherein the actuator is configured to reposition the boom arm to a position on an opposing side of the default direction from the detected deflection to counteract the deflection at an adjusted angle.

3. The system of claim 1, wherein the sensor comprises at least one of an accelerometer, a pressure sensor, a LIDAR sensor, a RADAR sensor, or an ultrasonic sensor.

4. The system of claim 1, a location device communicatively coupled to the computing system, the computing system being configured to receive location coordinates from the location device associated with the boom assembly and correlate the location coordinates to the boom assembly to generate or update a geo-located map.

5. The system of claim 1, wherein to manipulate the actuator when the magnitude of deflection deviates from a predefined threshold, the computing system is further configured to select the adjusted angle from a look up table of adjusted angle values stored in the memory based on the boom assembly deflection magnitude and direction.

6. The system of claim 1, wherein the computing system is configured to provide an alert when the deflection magnitude deviates from a predefined threshold.

7. The system of claim 1, wherein the actuator is configured to rotate the boom arm fore and aft of the default angle.

8. The system of claim 7, wherein the actuator is configured to rotate the boom arm at least 15 degrees aft of the default angle.

9. An agricultural sprayer system comprising:
- an actuator operably coupled with a frame and a boom arm, the actuator configured to rotate the boom arm between a plurality of angles in a fore-aft direction, the plurality of angles including a default angle defining a default axis relative to the frame;
- a sensor operably coupled with the boom arm and configured to capture data associated with a position of the boom arm; and
- a computing system communicatively coupled to the sensor, the computing system being configured to:
  - calculate a curvature of the boom assembly based on the data from the sensor;
  - calculate a fore-aft deflection direction when the boom arm is in a deflected position based on the curvature of the boom assembly;
  - calculate an offset distance between a first position of an outmost nozzle assembly in the default position and a second position of the nozzle assembly in the deflected position; and
  - rotate the boom arm through the actuator to an adjusted angle, wherein the boom arm is rotated in a direction opposite the deflection direction and the adjusted angle that reduces the offset distance.

10. The agricultural sprayer of claim 9, further comprising:
- a location device communicatively coupled to the computing system, the computing system being configured to receive location coordinates from the location device associated with the boom arm and correlate the location coordinates to the variance to generate or update a field map.

11. The agricultural sprayer of claim 9, wherein the computing system is further configured to select an adjusted angle for the boom arm from a look up table of adjusted angle values stored in the memory based on the boom arm deflection magnitude and direction.

12. An agricultural sprayer system comprising:
- an actuator operably coupled with a frame and a boom arm, the actuator configured to rotate the boom arm between a plurality of angles in a fore-aft direction, the plurality of angles including a default angle defining a default axis relative to the frame;
- a sensor operably coupled with the boom arm and configured to capture data associated with a position of the boom arm; and
- a computing system communicatively coupled to the sensor, the computing system being configured to:
  - calculate a curvature of the boom assembly based on the data from the sensor;
  - calculate a fore-aft deflection direction when the boom arm is in a deflected position based on the curvature of the boom assembly;
  - calculate an offset distance between a first position of an outmost nozzle assembly in the default position and a second position of the nozzle assembly in the deflected position; and
  - rotate the boom arm through the actuator to an adjusted angle, wherein the boom arm is rotated in a direction opposite the deflection direction and the adjusted angle that reduces the offset distance; and
  - provide a mitigation instruction when a deflection magnitude deviates from a predefined threshold.

13. The agricultural sprayer of claim 12, further comprising:
- a location device communicatively coupled to the computing system, the computing system being configured to receive location coordinates from the location device associated with the boom arm and correlate the location coordinates to the variance to generate or update a field map.

14. The agricultural sprayer of claim 12, wherein the computing system is further configured to select an adjusted angle for the boom arm from a look up table of adjusted angle values stored in the memory based on the boom arm deflection magnitude and direction.

* * * * *